Oct. 14, 1969     A. W. ORLANDO     3,473,042
AUTOMATIC THREADING STATUS DETECTION MEANS
Filed Dec. 15, 1967
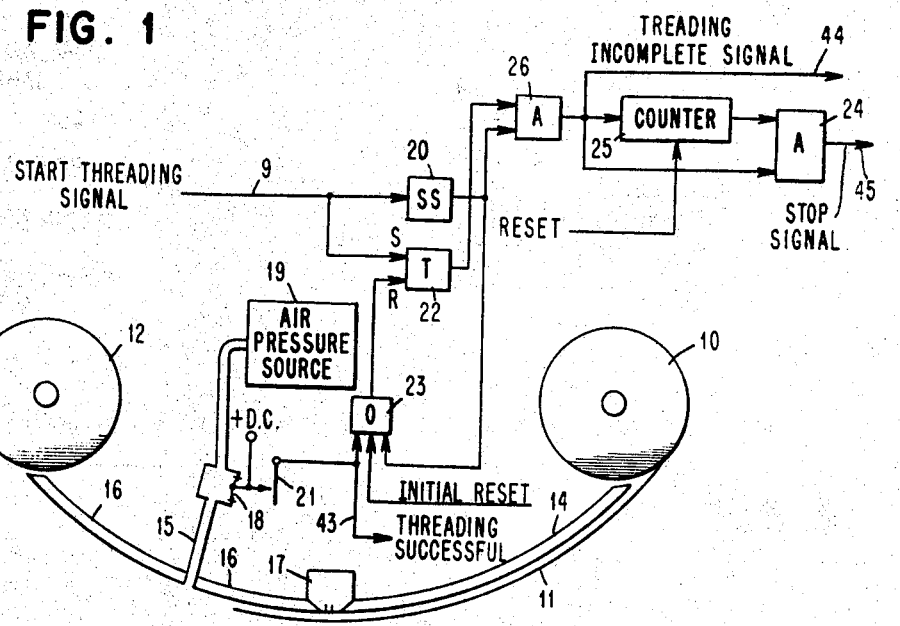
FIG. 1
FIG. 2
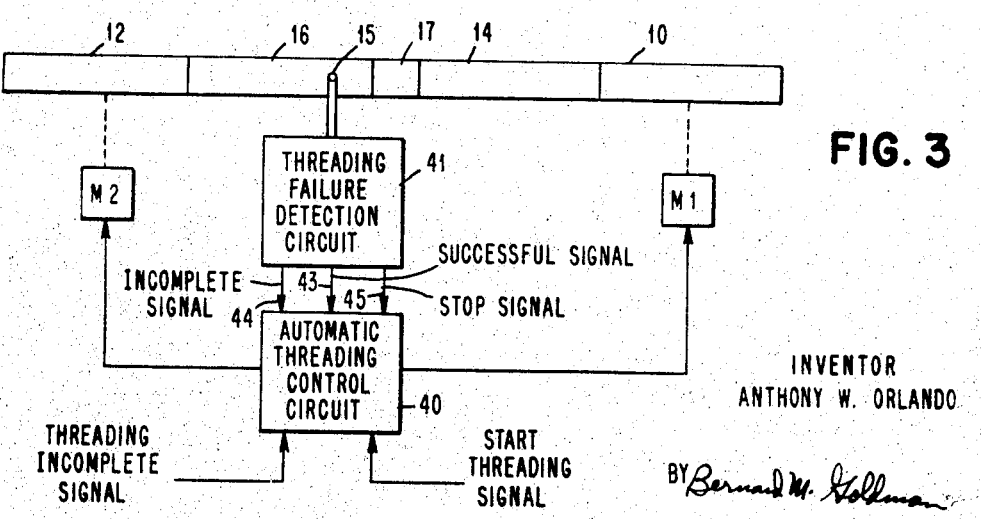
FIG. 3
INVENTOR
ANTHONY W. ORLANDO
BY Bernard M. Goldman
ATTORNEY

United States Patent Office 3,473,042
Patented Oct. 14, 1969

3,473,042
AUTOMATIC THREADING STATUS DETECTION MEANS
Anthony W. Orlando, Highland, N.Y., assignor to International Business Machines Corporation, Armonk, N.Y., a corporation of New York
Filed Dec. 15, 1967, Ser. No. 690,989
Int. Cl. H01h 35/24
U.S. Cl. 307—118        4 Claims

ABSTRACT OF THE DISCLOSURE

Means for determining the success of an automatic tape threading operation by detecting a pressure rise at a blowing air port when it is blocked by tape after a successful threading operation. Failure of an automatic threading operation is detected by lack of a success indication after a time-out period of at least the time period normally needed for an automatic threading operation. A retry of the automatic threading may automatically be attempted after each failure detection up to a predetermined number of times.

---

This invention generally provides a circuit for detecting the success or failure of an automatic threading attempt within a web handler.

Although the prior art shows numerous techniques for automatic threading, no prior art has been found on detecting the success or failure of automatic threading attempts.

It is therefore an object of this invention to provide a threading success signal after an automatic web threading attempt has been successful.

It is another object of this invention to provide a threading incomplete indication when an automatic web threading attempt has failed.

It is still another object of this invention to cause a rewind of a supply reel in response to a threading incomplete signal.

It is a further object of this invention to cause a next automatic threading attempt in response to a detection of an automatic threading failure.

It is a still further object of this invention to automatically cause any predetermined number of threading attempts to be made in response to successive automatic threading failure signals before the web handling system is halted for manual threading or other intervention.

The invention uses a blowing air port along the threading path with a pressure sensor connected to the port. The port is positioned along the web path at a point which will have the tape tension after threading is completed. During the threading operation, there is either (1) no web over the port, or (2) the web passes over the port without substantial tension and it cannot substantially block the exit of air from the port. With either (1) or (2), the air pressure at the port is not significantly above atmospheric pressure. If the threading operation is completed successfully, a resulting web tension occurs in response to pull from the take-up reel. This tension pulls the web against the port, which then becomes substantially blocked, and the air pressure at the port substantially increases. The pressure increase is sensed by a pressure sensor that correspondingly actuates electronic means to indicate a successful threading operation.

The invention also uses a time-out means which is actuated by an input signal that starts a web threading operation. The time-out period is at least the normal time needed for completion of a successful automatic threading operation. If the time-out completes without the threading operation being indicated as successful by a sensed pressure raise, a threading incomplete signal is generated. This threading incomplete signal can be used in a number of ways, such as (1) halting the threading operation so that manual threading may be attempted, or (2) signaling a rewind, starting a next automatic threading attempt, actuating a counter, and only halting further attempts after a predetermined number of counts, after which manual threading, or other remedial action, may be taken.

The foregoing and other objects, features and advantages of the invention will be apparent from the following more particular description of the preferred embodiment of the invention illustrated in the accompanying drawings of which:

FIGURE 1 illustrates an embodiment of the invention;
FIGURE 2 shows wave forms used in explaining the operation of the embodiment; and
FIGURE 3 represents the environment of the invention.

FIGURE 3 is a general arrangement showing an environment for a detailed embodiment of the invention represented by a Threading Failure Detection Circuit 41, which is shown in detail in FIGURE 1. An automatic Threading Control Circuit 40 receives a Start Threading signal to begin a threading operation. In response thereto circuit 40 controls a motor M2 to rotate a take-up reel 12 at a faster rate than a motor M1 rotates a supply reel; so that when tape is first received by a substantially-empty take-up reel 12, it attempts to pull the tape at a faster speed than the tape is being supplied by a substantially-full supply reel 10, in order to quickly obtain tape tension between the reels after a successful threading operation. Tape tension will force the tape to block port 15 in FIGURE 1, which causes a threading successful signal on a lead 43 to indicate to Control Circuit 40 in FIGURE 3 that normal tape operation should continue. On the other hand, if the threading operation fails, a Threading Incomplete Signal is provided on a lead 44 to control circuit 40 to indicate a retry. After a predetermined number of retries (which may be any predetermined number), a stop signal is provided by lead 44 to circuit 40 to cause the system to stop for manual intervention.

FIGURE 1 illustrates a tape drive which has means (not shown) for accomplishing automatic threading. There are numerous means available in the prior art for obtaining automatic threading in a tape drive, photographic reel device, etc. An example of such tape threading is found in patent application Ser. No. 565,549 filed July 15, 1966 by the same inventor as the subject invention, having the title "Vacuum Controlled Jet Transport Apparatus for Magnetic Tape." Briefly in that application, tape is automatically moved from a supply reel to a take-up reel without manual intervention.

In FIGURE 1, a Start Threading Signal on a lead 9 begins a threading operation. This signal may be a pulse which sets a trigger 22 and actuates a time-out single shot 20. The time-out period for single shot 20 is the time needed for a normal successful threading operation.

Supply reel 10 rotates slowly to provide tape 11 for the automatic tape treading operation in which the tape is to be moved to and received by the faster-rotating take-up reel 12. The tape is automatically transported along the path represented by the lower concave surfaces of guides 14 and 16 between reels 10 and 12. A read/write head assembly 17 is provided along the path.

A port 15 can be located at any place along the path 14 or 16 between supply reel 10 and take-up reel 12, since every place along the path of surfaces 14 and 16 is covered by tape under pressure due to tape tension at the end of a successful automatic threading operation. Such tension need only exist for a short period of time after an automaitc threading operation is completed, and may be interrupted shortly thereafter, for example, for tape to be loaded into vacuum columns (not shown) in any tape drive having vacuum columns.

In FIGURE 1, port 15 is formed through surface 16 along the threading path. The beginning of tap 11 is shown moving toward take-up reel 12 by means (not shown) but which is disclosed and claimed in the previously cited patent application Ser. No. 565,549.

A chamber 18, having a pressure switch diaphragm, is connected between port 15 and an air pressure source 19. When port 15 is not blocked, the air will be blowing from source 19 through the chamber 18 and port 15 to the atmosphere; and the pneumatic pressure within chamber 18 will be only slightly above atmospheric.

During the threading operation, take-up reel 12 is idly rotating, as previously mentioned. It has for example a vacuum hub for receiving the tape leader as tape 11 is brought to the end of the tape threading path. The rotational speed of reel 12 is such that it pulls the newly received tape at a slightly faster velocity than supply reel 10 is providing tape. Accordingly the newly threaded tape will be tensioned between reels 12 and 10 quickly after a successful automatic tape threading operation. The successful threading operation then is indicated by the tape under tension blocking port 15, which causes the air pressure in the chamber 18 to rise to very nearly the pressure of source 19. The pneumatic pressure sensor may be similar to the pneumatic switch commonly used with vacuum columns found in digital tape drives. This rise in pressure in chamber 18 moves the switch diaphragm and closes the switch contacts 21 to provide a Successful Threading Signal on lead 43 from the +D.C. source.

The operation of the invention is explained using the waveforms shown in FIGURE 2. When tape threading is required, a Start Threading Signal is provided, such as by the pulse shown in FIGURE 2(A). This pulse activates single shot 20 for the time-out period shown in FIGURE 2(B), and sets trigger 22 to the up-level shown in FIGURE 2(C). For a properly completed threading operation, contact 21 closes within the period of single shot 20 to provide the Threading Successful Signal shown in FIGURE 2(E) through an OR circuit 23 that resets trigger 22 to the down-level indicated by the solid line in FIGURE 2(C) following the pointer from the Threading Complete label. This down-level inhibits AND gate 26 and prevents the occurrence of any Threading Incomplete Signal.

If threading is not completed within the time-out of single shot 20, the output of trigger 22 remains up throughout the time-out period, as shown by the dashed line in FIGURE 2(C). When the time-out ends, AND gate 26 is enabled by the set state of trigger 22 to provide the Threading Incomplete Signal shown in FIGURE 2(D). The output of single shot 20 is also fed back through OR circuit 23 to reset trigger 22, which also ends the Threading Incomplete Signal pulse from gate 26.

The Threading Incomplete Signal can be used to signal a threading retry by causing a rewind of supply reel 10 and then inducing another Start Threading Signal.

Any particular number of threading retries may be attempted before the system gives up retrying and provides a Stop Signal from an AND gate 24. The output of a counter 25 is preset to a count representing the number of permissible retry attempts. When this number of Threading Incomplete Signals is received by counter 23, it provides an output signal to AND gate 24, which also receives each Threading Incomplete Signal. Hence gate 24 provides a Stop Signal output indication when the particular number of incompleted tries has been reached. Manual intervention may then be provided, such as by manual threading or repair of any defectively operating parts.

While the invention has been particularly shown and described with reference to a preferred embodiment thereof, it will be understood by those skilled in the art that the foregoing and other changes in form and details may be made therein without departing from the spirit and scope of the invention.

I claim:
1. Automatic web threading status detection means comprising,
   an automatic web threading path between a supply reel and a take-up reel,
   a pneumatic port being positioned along said web threading path,
   means for providing pneumatic pressure to said port,
   means for inducing web tension across said port after completion of a successful threading of said web,
   means for sensing a pressure change at said port to signal a successful threading operation,
   means for transmitting a start threading signal,
   a time-out means actuated by said start threading signal,
   said time-out means having a time-out period of not less than a normal time for a successful threading operation,
   and failure signaling means for sensing no substantial pressure change by said means for sensing a pressure change after said time-out period to provide a threading incomplete signal.

2. Automatic web threading status detection means as defined in claim 1 in which,
   said time-out means comprises a single shot actuated by a start threading signal,
   a bistable means set by the start threading signal and reset by the output state of said single shot after said time-out period,
   said failure signaling means comprising,
      an AND gate receiving inputs from said single shot, and from said bistable means signaling no pressure increase to provide a threading incomplete signal.

3. Automatic threading status detection means as defined in claim 2 further comprising,
   counter means for receiving each threading incomplete signal,
   said counter means being preset to provide an output at a predetermined count,
   an automatic threading control circuit being connected to receive said threading incomplete signal for starting another automatic threading operation in response to any threading incomplete signal,
   and an output of said counter providing a stop signal to said automatic threading control circuit to stop any further automatic web threading attempts.

4. An automatic web threading status detection means as defined in claim 1 further comprising,
   an AND gate being connected to said time-out means for being conditioned after said time-out period,
   a bistable means being set by the start threading signal,
   an OR circuit receiving an output of said time-out means and an output from said means for sensing a pressure change,
   means for resetting said bistable means in response to an output from said OR circuit,
   and said AND gate, when enabled, providing a threading incomplete signal.

References Cited

UNITED STATES PATENTS 3,127,120   3/1964   Selsted et al.
3,345,475   10/1967  Hope _____ 200—61.13

ROBERT K. SCHAEFER, Primary Examiner

T. B. JOIKE, Assistant Examiner

U.S. Cl. X.R.

226—100; 242—55.12; 340—259